(12) United States Patent
Mimassi

(10) Patent No.: US 11,816,746 B2
(45) Date of Patent: Nov. 14, 2023

(54) SYSTEM AND METHOD FOR DYNAMIC DINING PARTY GROUP MANAGEMENT

(71) Applicant: RockSpoon, Inc., San Jose, CA (US)

(72) Inventor: Nagib Georges Mimassi, Palo Alto, CA (US)

(73) Assignee: ROCKSPOON, INC, San Jose, CA (US)

(*) Notice: Subject to any disclaimer, the term of this patent is extended or adjusted under 35 U.S.C. 154(b) by 0 days.

(21) Appl. No.: 17/540,105

(22) Filed: Dec. 1, 2021

(65) Prior Publication Data

US 2022/0092709 A1   Mar. 24, 2022

Related U.S. Application Data

(63) Continuation-in-part of application No. 17/037,200, filed on Sep. 29, 2020, now abandoned, which is a
(Continued)

(51) Int. Cl.
G06Q 50/12 (2012.01)
G06Q 10/02 (2012.01)
(Continued)

(52) U.S. Cl.
CPC ............ *G06Q 50/12* (2013.01); *G06Q 10/02* (2013.01); *H04L 51/046* (2013.01); *H04L 51/224* (2022.05); *H04W 4/021* (2013.01)

(58) Field of Classification Search
CPC ...... G06Q 20/12; G06Q 10/02; H04L 51/224; H04L 51/046; H04W 4/021
See application file for complete search history.

(56) References Cited

U.S. PATENT DOCUMENTS 9,659,333 B2   5/2017  Padgett et al.
10,482,551 B2 * 11/2019 Zomet ................... G06Q 50/12
(Continued)

FOREIGN PATENT DOCUMENTS

CN       112088070 A  * 12/2020  .............. B25J 9/162
DE  112016005667 T5 *  8/2018  ........... G06Q 20/202
(Continued)

OTHER PUBLICATIONS

Vindya Liyanage, "Foody—Smart Restaurant Management and Ordering System", published by IEEE in 2018, all pages (Year: 2018).*

*Primary Examiner* — Omar Zeroual
(74) *Attorney, Agent, or Firm* — Galvin Patent Law LLC; Brian R. Galvin; Brian S. Boon

(57) ABSTRACT

A system and method for dynamic dining patty group management that may comprise a software application operating on a user mobile device which facilitates communication with other application users, restaurant devices, and a dining party management server which provides various services for implementing dining party group management. Restaurant devices may include various detection devices that detect the late arrival of a dining party group member, wherein the detection of a late arrival may be communicated with the dining party management server such that the server generates and sends a text-based message to the mobile device of the late arriving dining party member that confirms the mobile device user is a dining party member and allows the user to place a food order via their mobile phone such that the food order arrives at the same time as the rest of the dining party's food orders.

1 Claim, 12 Drawing Sheets

Related U.S. Application Data continuation-in-part of application No. 16/993,488, filed on Aug. 14, 2020, now abandoned.

(60) Provisional application No. 63/244,079, filed on Sep. 14, 2021, provisional application No. 62/956,289, filed on Jan. 1, 2020, provisional application No. 62/956,293, filed on Jan. 1, 2020.

(51) Int. Cl.
   *H04W 4/021* (2018.01)
   *H04L 51/046* (2022.01)
   *H04L 51/224* (2022.01)

(56) References Cited

U.S. PATENT DOCUMENTS

| | | | |
|---|---|---|---|
| 10,579,808 B2* | 3/2020 | Baldwin | H04L 63/101 |
| 10,977,751 B1* | 4/2021 | Bernstein | G06Q 10/0832 |
| 2006/0200374 A1* | 9/2006 | Nelken | G06Q 10/109 |
| | | | 705/7.19 |
| 2014/0343976 A1* | 11/2014 | Ahluwalia | G06Q 50/12 |
| | | | 705/5 |
| 2015/0019354 A1* | 1/2015 | Chan | G06Q 10/109 |
| | | | 99/325 |
| 2015/0088671 A1* | 3/2015 | Xiong | G06Q 50/12 |
| | | | 705/15 |
| 2015/0260699 A1* | 9/2015 | Minvielle | A47J 43/0716 |
| | | | 700/90 |
| 2016/0059412 A1* | 3/2016 | Oleynik | A47J 36/321 |
| | | | 700/250 |
| 2016/0173436 A1* | 6/2016 | Koolwal | H04L 51/52 |
| | | | 709/206 |
| 2016/0244311 A1* | 8/2016 | Burks | B67D 1/0888 |
| 2016/0247113 A1* | 8/2016 | Rademaker | G06Q 10/083 |
| 2017/0278022 A1* | 9/2017 | Mimassi | G06Q 50/12 |
| 2017/0278202 A1* | 9/2017 | Mimassi | G06Q 50/12 |
| 2017/0308818 A1* | 10/2017 | Almishari | G06Q 10/02 |
| 2017/0364836 A1* | 12/2017 | Li | G06Q 20/102 |
| 2018/0025318 A1* | 1/2018 | Baggott | G06Q 10/047 |
| | | | 705/334 |
| 2018/0075404 A1 | 3/2018 | Hendrickson | |
| 2018/0189729 A1* | 7/2018 | Droege | G01C 21/3605 |
| 2018/0324156 A1* | 11/2018 | Mu | H04W 4/80 |
| 2018/0330293 A1* | 11/2018 | Kulkarni | G06K 7/10366 |
| 2019/0012625 A1* | 1/2019 | Lawrenson | G07C 5/008 |
| 2019/0130320 A1* | 5/2019 | Friend, V | H04W 4/025 |
| 2020/0065734 A1* | 2/2020 | Szybalski | G06Q 30/0635 |
| 2021/0042724 A1* | 2/2021 | Rathod | G07G 1/0054 |
| 2021/0089995 A1* | 3/2021 | Iacono | G06Q 10/083 |
| 2021/0142226 A1* | 5/2021 | Sahni | G01C 21/00 |
| 2021/0256592 A1* | 8/2021 | Lee | G06Q 30/0635 |
| 2021/0374885 A1* | 12/2021 | Musk | G06Q 20/40155 |
| 2021/0406815 A1* | 12/2021 | Mimassi | G06Q 10/063118 |
| 2022/0036336 A1* | 2/2022 | Goolkasian | H04L 67/34 |
| 2022/0092483 A1* | 3/2022 | Chuprevich | G06Q 30/0201 |
| 2022/0207592 A1* | 6/2022 | Swanson | G06Q 30/0635 |
| 2022/0207593 A1* | 6/2022 | Swanson | G06Q 30/0641 |
| 2022/0207626 A1* | 6/2022 | Swanson | G06Q 10/02 |
| 2022/0207627 A1* | 6/2022 | Swanson | G06Q 20/202 |

FOREIGN PATENT DOCUMENTS

| | | | | |
|---|---|---|---|---|
| WO | WO-2007041672 A2 * | 4/2007 | | G06Q 30/02 |
| WO | WO-2018236441 A1 * | 12/2018 | | A61B 5/1176 |
| WO | WO-2021198936 A1 * | 10/2021 | | |

* cited by examiner

SYSTEM AND METHOD FOR DYNAMIC DINING PARTY GROUP MANAGEMENT

CROSS-REFERENCE TO RELATED APPLICATIONS

Priority is claimed in the application data sheet to the following patents or patent applications, the entire written description of each of which is expressly incorporated herein by reference in its entirety:
17/037,200
62/956,993
16/993,488
62/956,289

BACKGROUND

Field of the Art

The disclosure relates to the field of restaurant management, and more particularly to the field of food order and dining party management.

Discussion of the State of the Art

When a dining party arrives at a restaurant they are typically seated and restaurant wait staff begin food service for the dining party. Sometimes, not all members of a dining party may arrive at the same time and in these cases the partial dining party Tray be seated so that the restaurant can keep operating on their schedule, as other dining parties may be arriving or reservations may be made for the dining party's table such that waiting for the missing dining party members may not be tenable by the restaurant staff and management. Additionally, when a dining party is created it is usually done so because the creator the dining party wants to dine, converse, and interact with the other dining party members over a meal. This interaction can be negatively affected if a member of the dining party arrives late. For example, if the dining party has further plans after dining, such as going to see a movie after dinner, then the late arrival of a dining party member who then needs to order food and wait for the food to be prepared after the rest of the dining party has already received their food can cause further disruptions to the group's schedule.

What is needed is a system and method for dynamic dining party group management that overcomes these limitations such that dining party members who arrive on time and late-arriving dining party members can be served their meals at the same time, without necessitating that the dining party members who arrived on nine need to wait to order their food until the arrival of the missing members. Such a system and method should allow for the entire dining party to be served their food at the same time such that they can enjoy their meals and the company of the other members without causing stress over scheduling and prior engagements.

SUMMARY

Accordingly, the inventor has conceived and reduced to practice, a system and method for dynamic dining party group management that may comprise a software application operating on a user mobile device which facilitates communication with other application users, restaurant devices, and a dining party management server which provides various services for implementing dining party group management. Restaurant devices may include various detection devices that detect the late arrival of a dining party group member, wherein the detection of a late arrival may be communicated with the dining party management server such that the server generates and sends a text-based message to the mobile device of the late arriving dining party member that confirms the mobile device user is a dining party member and allows the use to place a food order via their mobile phone such that the food order arrives at the same time as the rest of the dining party's food orders.

According to a preferred embodiment, a system for dynamic dining party group management, is disclosed, comprising: a dining party management server comprising at least a plurality of programming instructions stored in a memory of, and operating on at least one processor of, a computing device, wherein the plurality of programming instructions, when operating on the at least one processor, causes the computing device to: receive and store a created dining party, the created dining party comprising dining party details; receive missing dining party member group member identification information generate a text-based message, the text-based message comprising an imitation to join the created dining party and an embedded link; and send the text-based message to a mobile device software application associated with the missing dining party group member; and a mobile device software application comprising at least a plurality of programming instructions stored in a memory of, and operating on at least one processor of, a computing device, wherein the plurality of programming instructions, when operating on the at least one processor, causes the computing device to: receive the text-based message from the dining party management server; redirect the user of the mobile device software application to a food ordering portal, the food ordering portal being associated with the created dining party and displaying the dining party details; allow a mobile device software application user to place a food order using the food ordering portal; and send the food order to a restaurant computing device; and a restaurant computing device comprising at least a plurality of programming instructions stored in a memory of, and operating on at least one processor of, a computing device wherein the plurality of programming instructions, when operating on the at least one processor, causes the computing device to: detect the arrival of a missing dining party group member; send missing dining party group member identification information to a dining party management server; receive the food order from the mobile device software application; and append the food order to a dining party ticket and assign a priority to the food order.

According to another preferred embodiment, a method for dynamic dining party group management, is disclosed, comprising the steps of: receiving and storing a created dining party, the created dining party comprising dining party details; receiving missing dining party member group member identification information; generating a text-based message, the text-based message comprising an invitation to join the created dining party and an embedded link; sending the text-based message to a mobile device software application associated with the missing dining party group member; receiving the text-based message from the dining party management server; redirecting the user of ale mobile device software application to a food ordering portal, the food ordering portal being associated with the created dining party and displaying dining party details; allowing a mobile device software application user to place a food order using the food ordering portal; sending the food order to a restaurant computing device; detecting the arrival of a missing dining party group member; sending missing dining party group member identification information to a dining panty management server; receiving the food order from the mobile device software application; and appending the food order to a dining party ticket and assigning a priority to the food order.

According to an aspect of an embodiment, wherein the restaurant computing device and mobile device each further comprise a low emission transmitter and receiver and an application configured to utilize such a transmitter and receiver.

According to an aspect of an embodiment, wherein each device has an operating range for its low emission transmitter and receiver to operate, and when the device crosses this threshold, it may receive a beacon transmission from another device and they may transmit communications with each other.

According to an aspect of an embodiment, wherein the beacon transmission is used to detect the arrival of a missing dining party group member.

According to an aspect of an embodiment, wherein the restaurant computing device further comprises at least one biometric scanner and wherein the biometric scanner is used to detect the arrival of a missing dining party group member.

According to an aspect of an embodiment, wherein the missing dining part member group member identification information comprises at least one of: a name; a phone number; a unique mobile device identifier; biometric data; an account name or social media handle; or an email address.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

Figure 6:
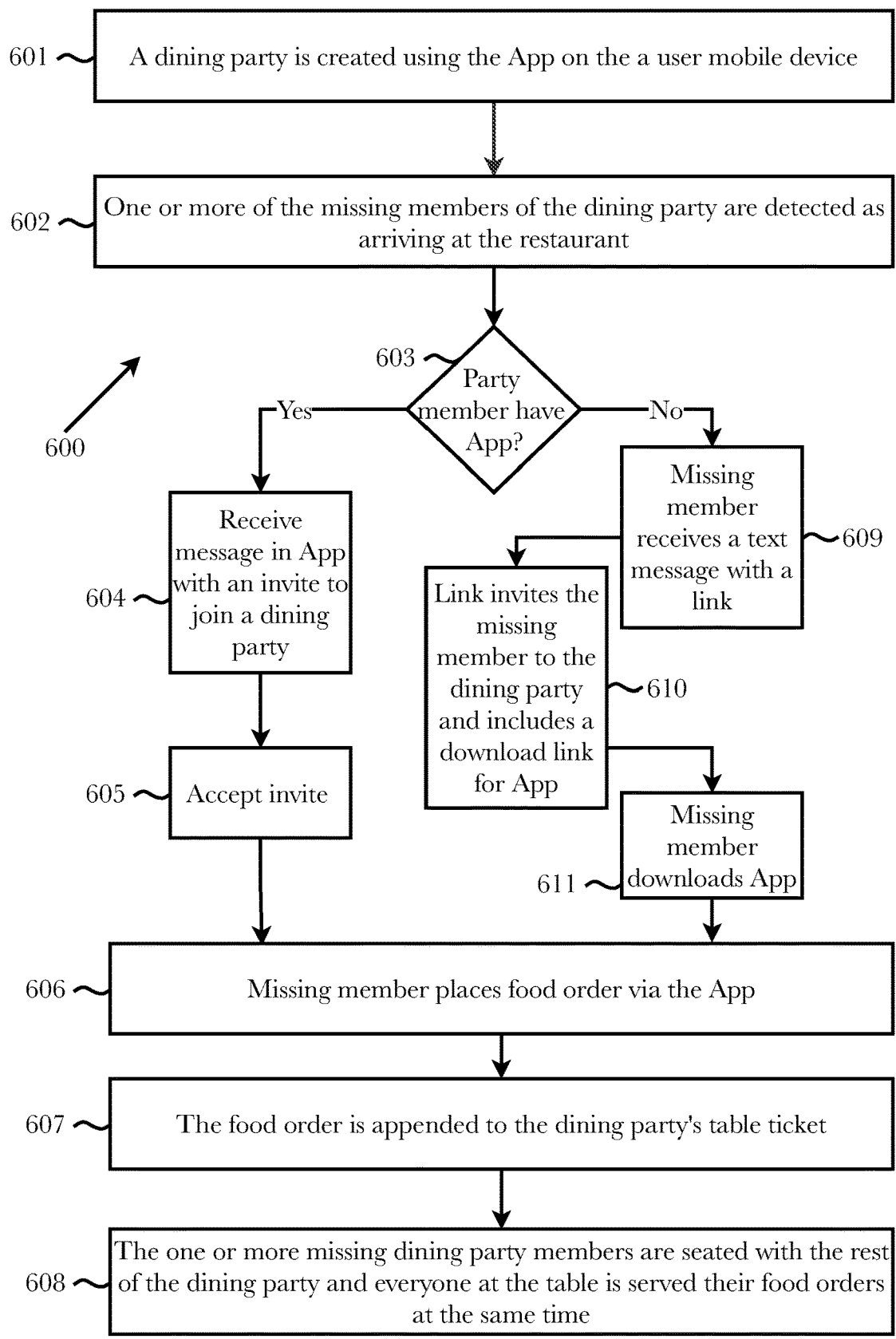

FIG. 6 a flow diagram illustrating an exemplary method for dynamic dining party group management using text-based messages to manage late arriving dining party members, according to an embodiment.

Figure 7:
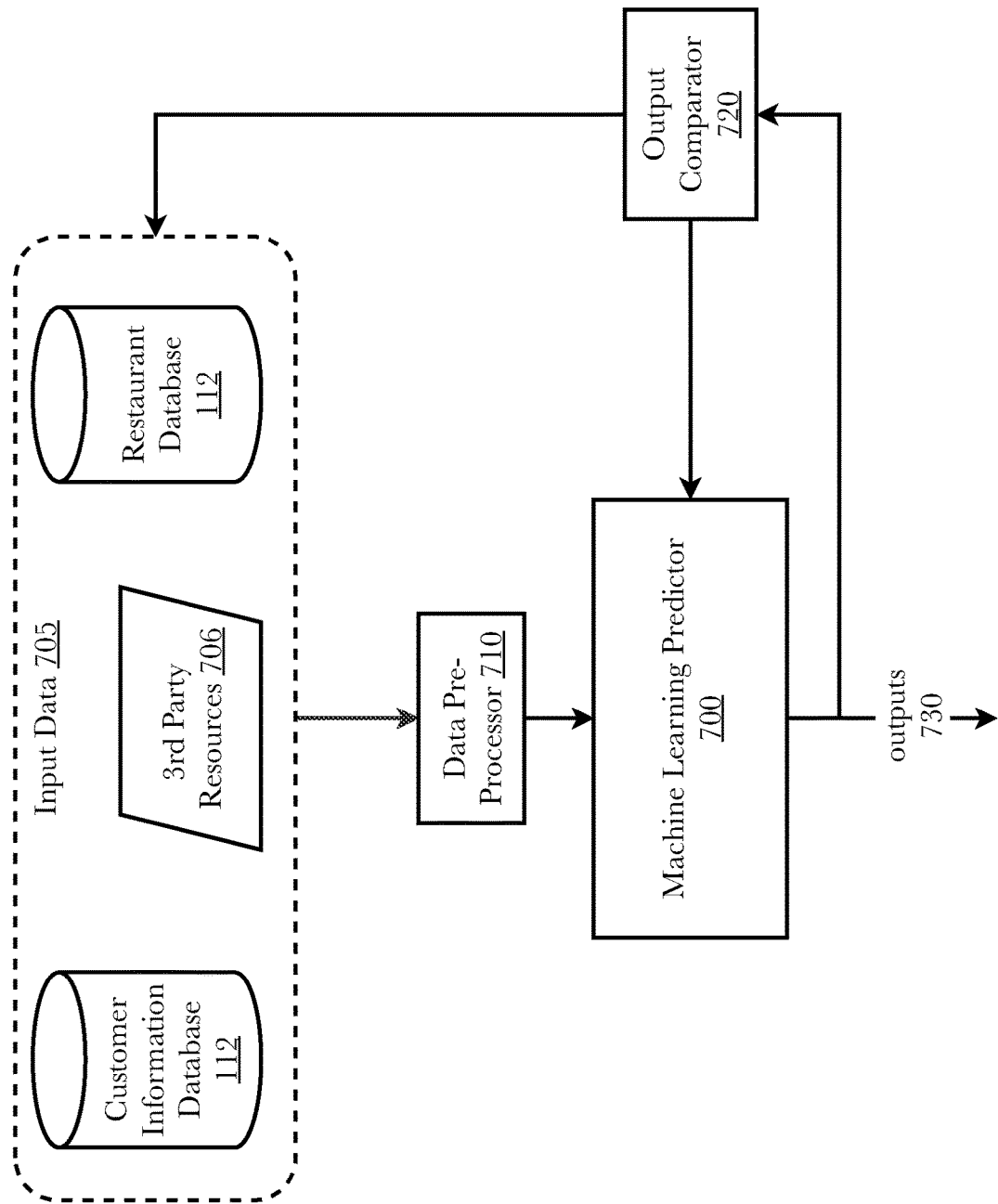

FIG. 7 is a block diagram illustrating an exemplary architecture for an aspect of the dining party group management system, a machine learning predictor, according to an embodiment.

Figure 8:
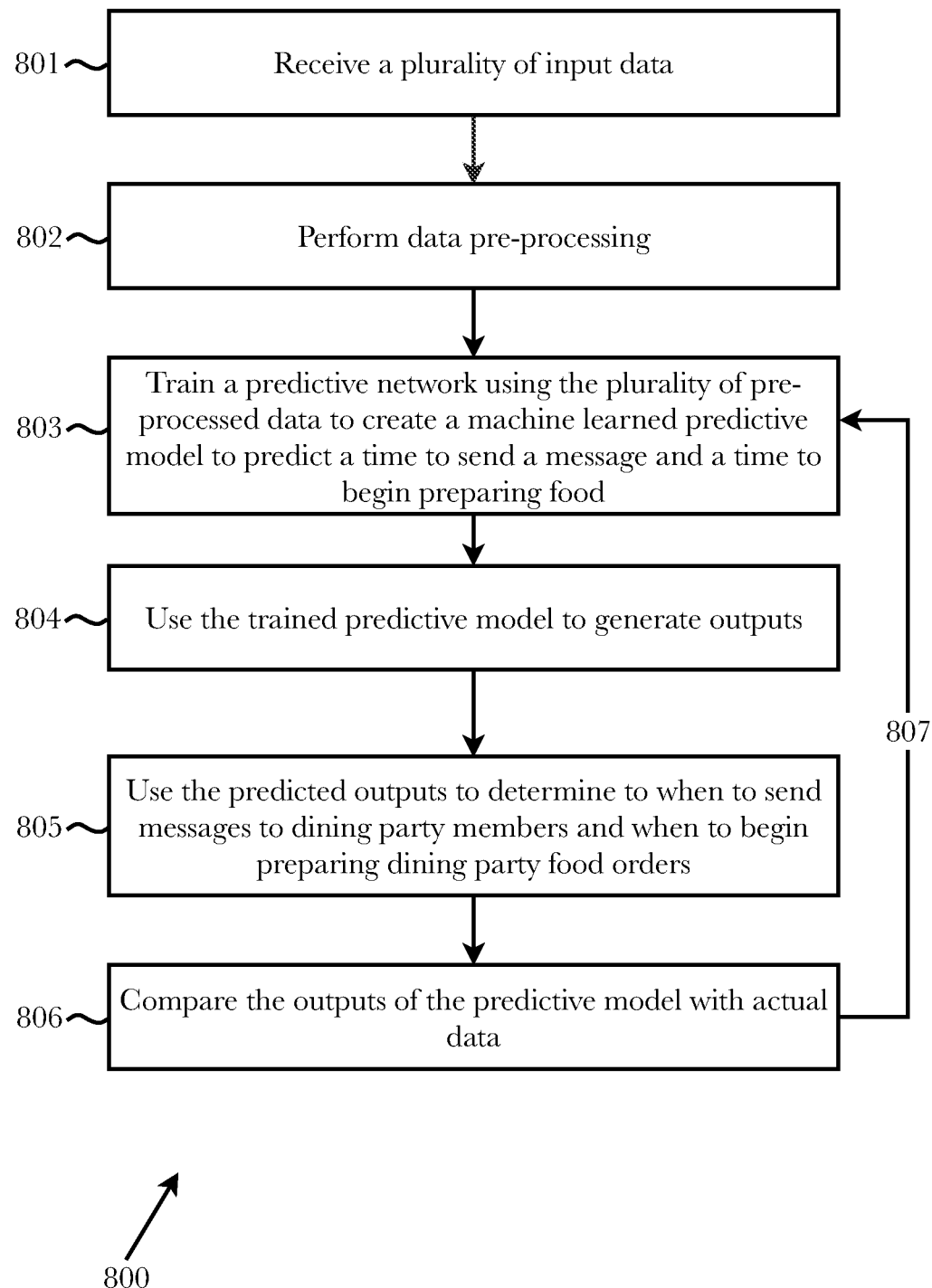

FIG. 8 is a flow diagram illustrating an exemplary process for training a machine learning predictor, according to an embodiment.

Figure 9:
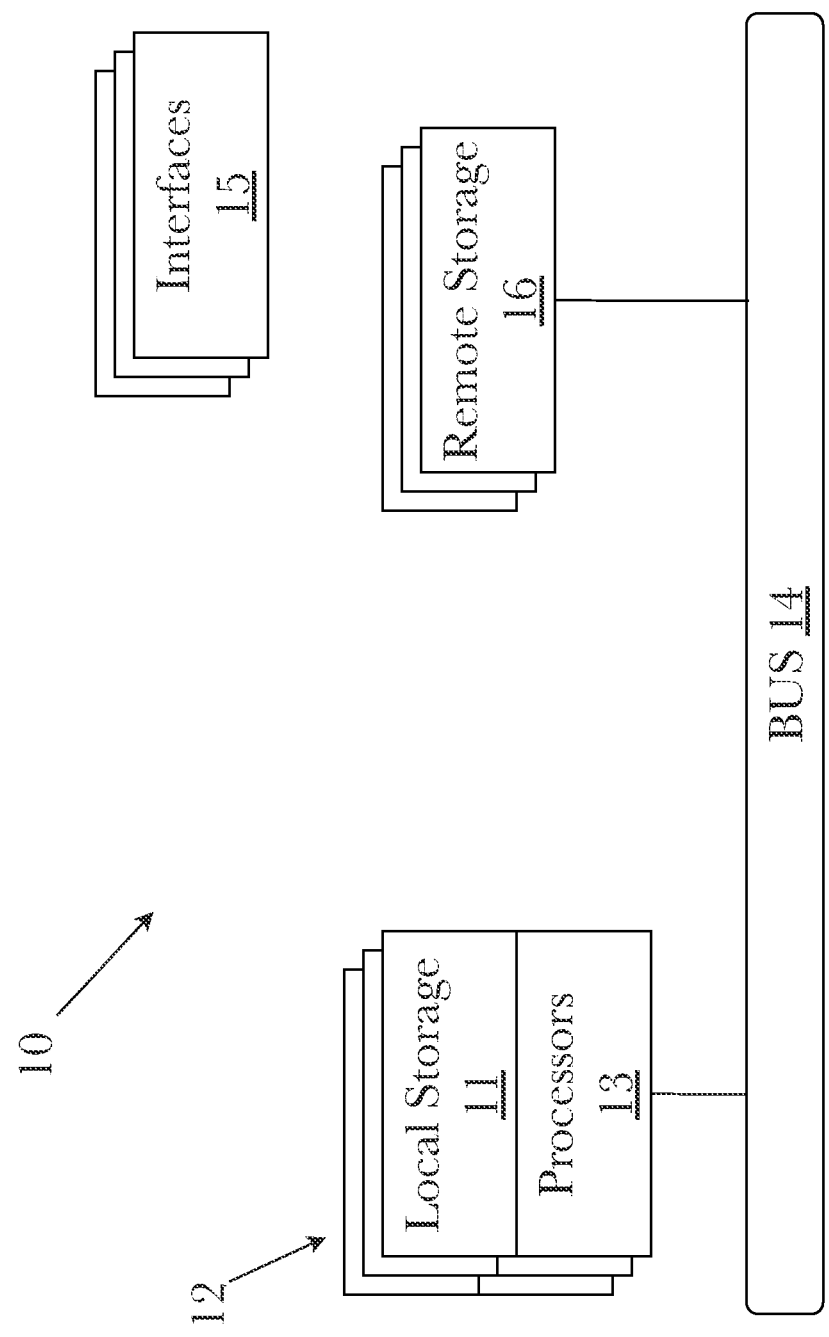

FIG. 9 is a block diagram illustrating an exemplary hardware architecture of a computing device.

Figure 10:
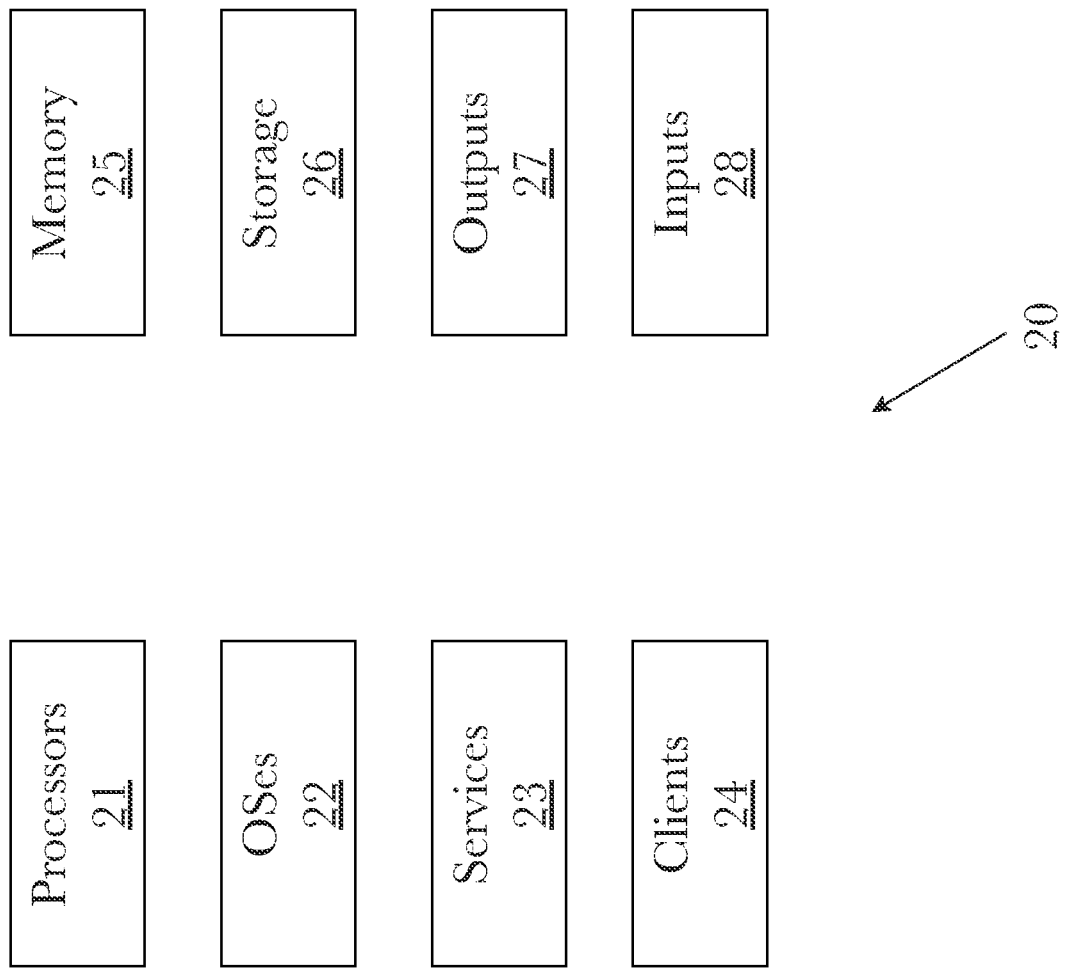

FIG. 10 is a block diagram illustrating an exemplary logical architecture for a client device.

Figure 11:
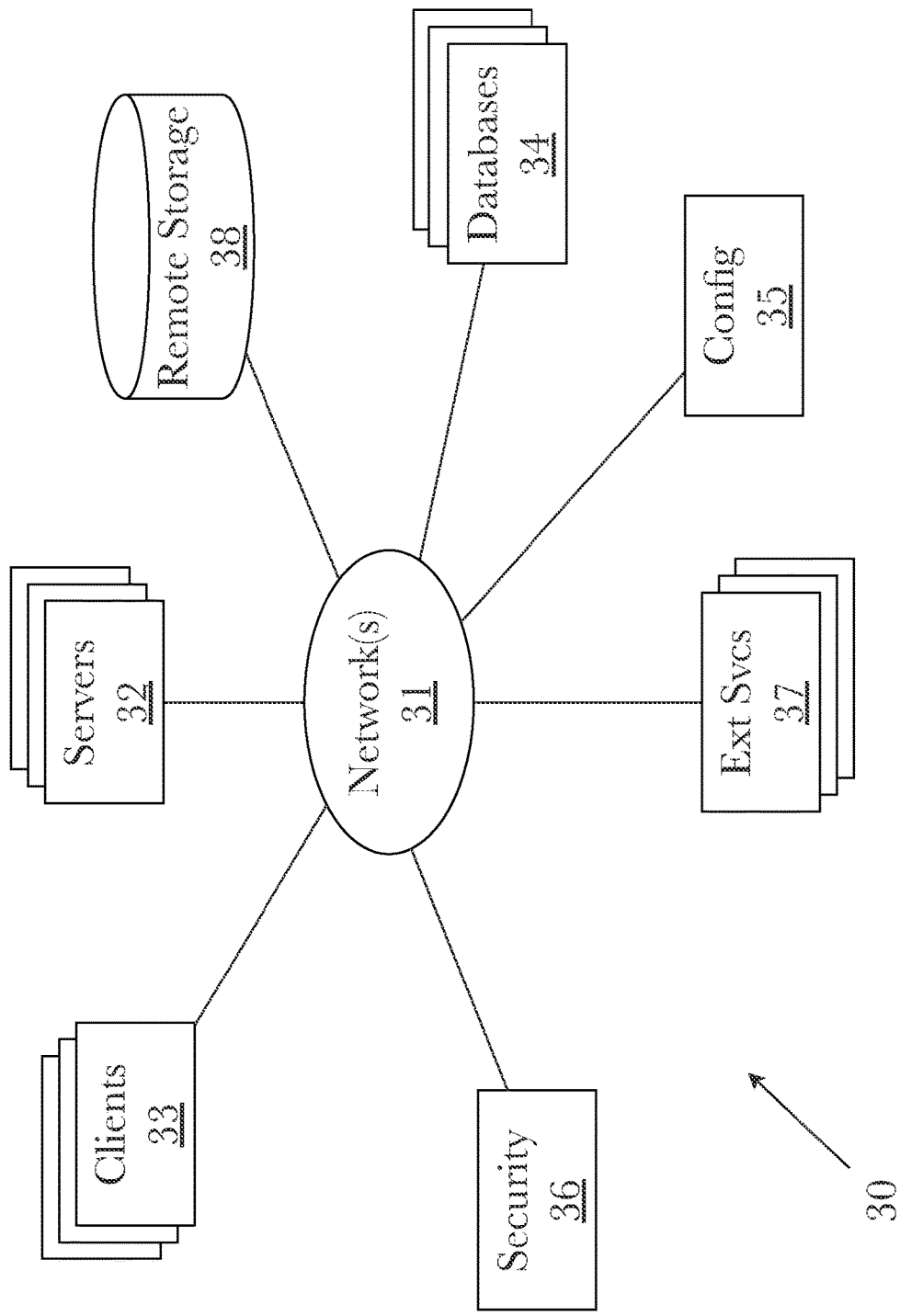

FIG. 11 is a block diagram showing an exemplary architectural arrangement of clients, servers, and external services.

Figure 12:
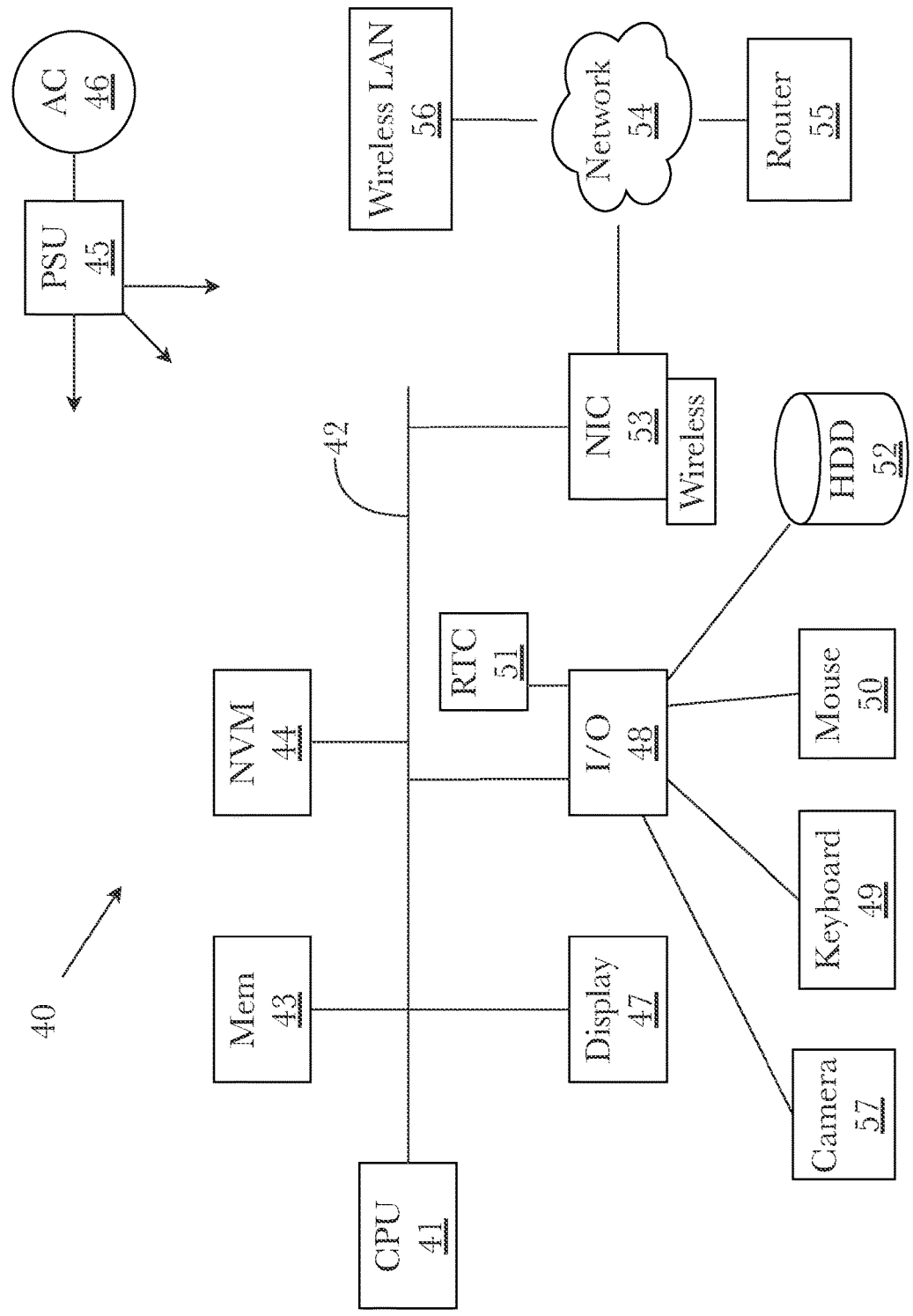

FIG. 12 is another block diagram illustrating an exemplary hardware architecture of a computing device.

DETAILED DESCRIPTION

The inventor has conceived, and reduced to practice, a system and method for dynamic dining party group management that may comprise a software application operating on a user mobile device which facilitates communication with other application users, restaurant devices, and a dining party management server which provides various services for implementing dining party group management. Restaurant devices may include various detection devices that detect the late arrival of a dining party group member, wherein the detection of a late arrival may be communicated with the dining party management server such that the server generates and sends a text-based message to the mobile device of the late arriving dining party member that confirms the mobile device user is a dining party member and allows the user to place a food order via their mobile phone such that the food order arrives at the same time as the rest of the dining party's food orders.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition devices that are in communication with each other may communicate directly or indirectly through one or more communication means or intermediaries, logical or physical.

A description of an aspect with several components in communication h each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are riot explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

[CHOOSE APPROPRIATE DEFINITIONS FROM "COMPUTER TERMINOLOGY DEFINITIONS" FILE]

Conceptual Architecture

Figure 1:
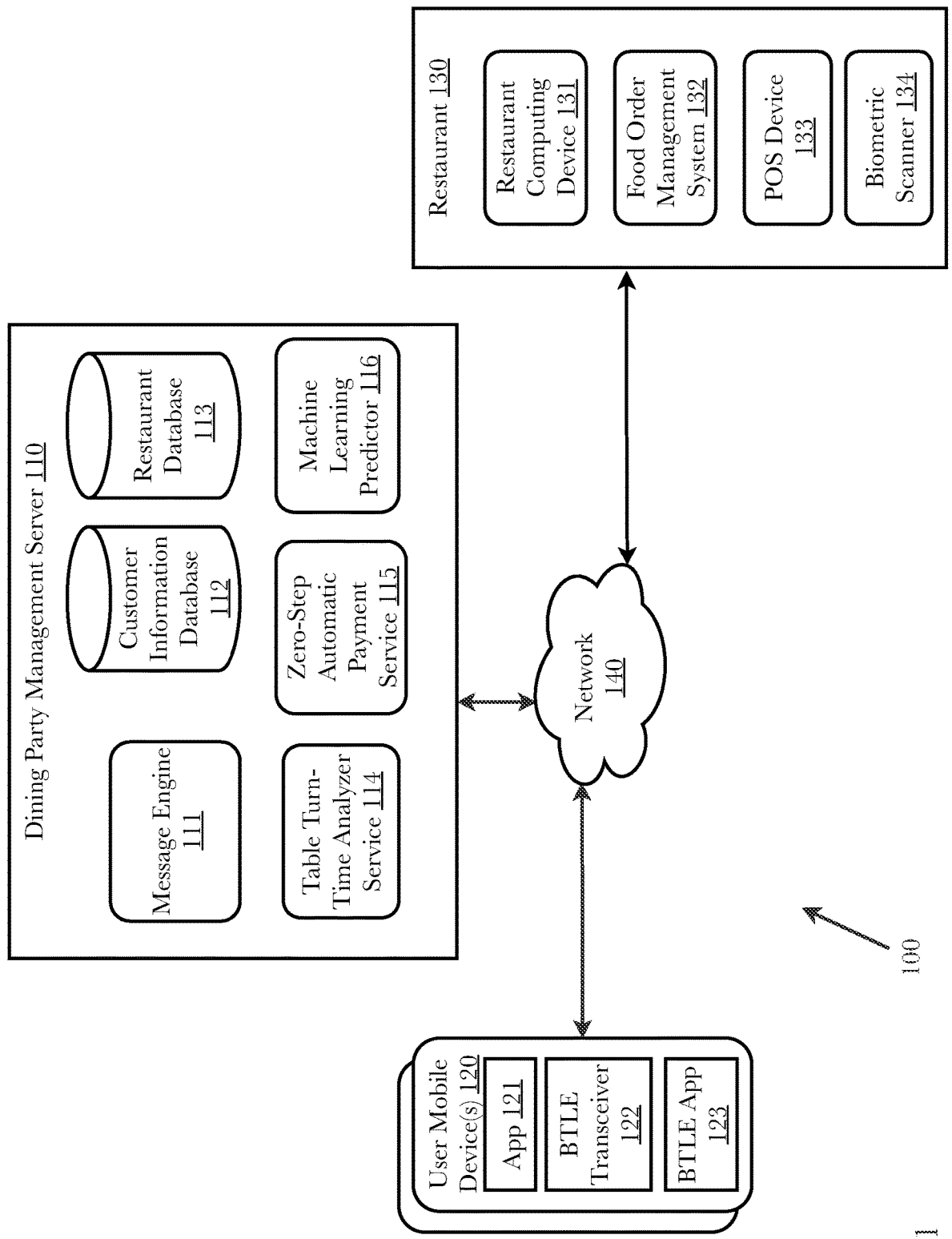
FIG. 1 is a block diagram illustrating an exemplary system architecture for dynamic dining party group management, according to one aspect.

FIG. 1 is a block diagram illustrating an exemplary system architecture 100 for dynamic dining party group management, according to one aspect. According to sonic embodiments, system 100 may comprise a dining party management server 110, a restaurant 130 comprising a restaurant computing device 131, one or more restaurant mobile devices 132, and a point-of-sale ("POS") device 133, user mobile device(s) 120, and one or more databases 112, 113, and a network 140. According to some embodiments, dining party management server 110 may comprise a message engine 111, a customer information database 112, a restaurant database 113, a table turn-time analyzer 114, and a zero step automatic payment service 115. According to some embodiments, user mobile device(s) 120 may comprise a software application ("App") 121 stored in the memory of the mobile device 120 and operable on the operating system of the mobile device 120, a BLUETOOTH™ low emission ("BTLE") transceiver 122, and a BTLE software application 123. In some aspects, restaurant 130 may also comprise a biometric scanner 134 to assist in customer (e.g., mobile device 120 user) identification.

According to some embodiments, network 140 may be configured to facilitate bi-directional communication and data exchange among and between user mobile device 120, dining party management server 110, and restaurant 130 devices. Network 140 may comprise one or more suitable network configurations including, but not limited to, the internet, wireless networks (e.g., BLUETOOTH™, radio frequency identification ("RFiD") etc.), wide area networks ("WAN"), local area networks ("LAN"), and cellular networks. When used in a LAN networking environment, restaurant computing device 131 may be connected to the LAN through a network interface not pictured) or adapter in a communication is module (not pictured). When used in a WAN networking; environment, the restaurant computing device 131 may include a modem or other means for establishing communications over the WAN, such as the internet or another type of computer network. It will be appreciated that the network 140 connections shown are illustrative, and other means of establishing a communications link between user mobile device 120, dining party management server 110, and restaurant 130 may be used. Various well known protocols such as TCP/IP, Ethernet, FTP, HTTP and the like may be used, and the system may be operated in a client-server configuration to perm t a user to retrieve a web page from a web-based server. Further, various conventional web browsers may be used to display and manipulate web pages.

According to some embodiments, user mobile device 120 may be any suitable mobile device including, but not limited to, smart phones, tablets, smart wearables, and laptop computers. According to various embodiments, user mobile device 120 may comprise an App 121 configured to allow the mobile device user to interact with restaurants and other App 121 users. Examples of such interactions can include, but are riot limited to: making reservations at a restaurant or getting on a waitlist; ordering food for dine-in or pick-up; searching for restaurants, menu items, ingredients, and other App 121 users; managing App account settings and preferences such as user profile information, food preferences, automatic payment accounts, biometric permissions, receiving special offers, receiving notification and/or messages, messaging with other App 121 users and/or a restaurant and its staff; managing a dining party; and bill splitting, among other uses. The App 121 may be configured to operate on a plurality of mobile device operating systems ("OS") such as, for example, APPLE™ iOS™, ANDROID™ OS, BLACKBERRY™ OS, and WINDOWS MOBILE™ OS. The App 121 may be a free or purchasable software application and can be downloaded from an appropriate digital distribution service such as, for example, APPLE APP STORE™ or GOOGLE PLAY™.

According to an aspect of various embodiments, user mobile device 120 may further comprise a BTLE transmitter and receiver 122 and an application 123 that is configured to utilize such a transmitter/receiver. Each device has an operating range for its BTLE transmitter/receiver to operate, and when the device crosses this threshold, it may receive a beacon transmission from another device (e.g., restaurant computing device 131, restaurant mobile device 132), and they may transmit communications with each oilier.

According to various embodiments, restaurant 130 may comprise a restaurant computing device 131, a food order management system 132, and a POS device 133. Examples of restaurant computing devices 131 can include, but are not limited to, desktop computer, laptop computer, a server, or a tablet. Restaurant computing device may be communicatively coupled with food order management system 132 and a POS device 133. In some embodiments, restaurant computing device 131 may be configured to perform the functionality of a POS device, in which case the existence of a separate POS device 133 is not necessary. Similarly, in some embodiments, food order management system 132 may be configured to operate on restaurant computing device 131, wherein food order management system 132 may be communicatively coupled with the POS device 133 or may be configured with software that causes food order management system 132 to function as a POS system, Furthermore, restaurant computing device 131 and/or food order management system 132 may be communicatively coupled to one or more restaurant back-of-house stations such that front-of-house activities (e.g., checking in guests, seating guests, waitlist management, clearing tables, etc.) may be coordinated with back-of-house activities (e.g., food prep, food cooking, food packaging, food plating, etc.). For example, a restaurant computing device 131 may determine that late arriving dining party member has arrived at restaurant 130 and may receive from the late arriving member's mobile device 120 a food order; the food order, via food order management system 132, may then be appended to the ticket associated with the dining party and sent to back-of-house staff and stations such that the late arriving food order is prepared at the same time as the rest of the dining party members' food orders.

According to some embodiments, restaurant computing device 131 and/or PUS devices 133 may also comprise a BTLE transceiver and BTLE application that is configured to utilize such a transceiver. When the BTLE transceiver operating on restaurant computing device 131 may transmit a low emissions beacon which can detect the presence of the BTLE transceiver 122 operating on user mobile device 120. The two devices 131 and 120 may then establish a low emissions network connection which allows for the devices to be communicatively coupled and to share device identification data, such as, for example, the MAC address associated with the user mobile device 120.

According to an aspect, restaurant 130 may further comprise a biometric scanner 134 configured to scan customers and authenticate their identity based on matching biometric data stored in customer information database 112. Biometric scanner 134 may be any one of, or a combination of, a fingerprint scanner, eye scanner, facial recognition scanner, voice scanner, or other biometric scanner to identify individuals, for either one-step or zero-step authentication and determination of customer arrival at restaurant 130. Biometric scanner 134 may be communicatively coupled with restaurant computing device 131 or with dining part e server 110 via network 140. Biometric scanner 134 may scan a customer as they enter a restaurant and compare the scan data with biometric data stored in customer information database 112 to identify a matched customer based on biometric scan data.

According to various embodiments, dining party management server 110 may comprise a message engine 111, a customer information database 112, a restaurant database 113, a table turn-time analyzer service 114, a zero-step automatic payment service 115, and a machine learning predictor 116. In an embodiment, server 110 may be disposed locally in restaurant 130. In an embodiment, server 110 may be disposed at remote location independent from restaurant 130 (e.g., cloud based). The customer information database 112 and restaurant database 113 may comprise any suitable storage medium or device known in the art. For example, databases 112, 113, may be relational databases, NoSQL, databases, cloud databases, wide column databases, object-oriented databases, key-value databases, or hierarchal databases. In an embodiment, the databases 112, 113 are disposed locally at the restaurant 130. In an embodiment, the databases 112, 113 are disposed at a location remote from the restaurant (e.g., cloud based). In an embodiment, the databases 112, 113 are a component of the dining party management server 110. In an embodiment, the databases 112, 113 are independent databases that are not components of the dining party management server 110. The customer information database 112 may be configured to store customer information including, but not limited to: customer demographic data (e.g., age, gender, ethnicity, etc.); food preferences such as type of food (e.g., Italian, Chinese, Indian, spicy, etc.), preferred menu items (e.g., spaghetti, egg rolls, chicken tikka masala, etc.), preferred ingredients (e.g., organic, fresh, locally sourced, etc.), and food allergies; restaurant preferences (e.g., fast casual, tine-dining, etc.); customer phone number, email address, physical address, linked social media accounts, hobbies and interests, and personal and professional traits; mobile device 120 unique identification numbers; customer App 121 login credentials (e.g., account username and password); App 121 friends list; customer historical data (e.g., restaurants dined at or ordered from, purchase history, special requests, date and time of purchase, etc.); customer biometric data; and customer financial data (e.g., bank account or bank card information for use with zero-step automatic payment service 115). The restaurant database 113 may be configured to store restaurant information including, but not limited to: hours of operation and location data (e.g., address); menu, food items, and ingredient lists; server (e.g., wait stall) data (e.g., years of experience, hobbies and interests, personal and professional traits, food knowledge, customer rating, work schedules, pay schedule, etc.); reservations, dining parties, and waitlists; staff schedules; inventory (e.g., food items, plates, napkins, silverware, to-go boxes, etc.); and food specials (e.g., daily and/or weekly) and/or special promotions.

According to various embodiments, a customer may use the App 121 on the user mobile device 120 to make a reservation with or sign-up on a waitlist for restaurant 130. If the customer is not dining alone they can create a dining party group in the App 121 by selecting from their friend list the dining party members who w be joining the customer at the restaurant. When a dining party is created in the App 121, other App 121 users who are included in the dining party may receive, on their own mobile devices, an indication such as a notification that they have been added to a dining party and the notification may include dining party details such as the names of the other members of the dining party, the restaurant and its location, and the time of the reservation or time to arrive at restaurant 130. When a dining party is created in the App 121, the dining party details may be sent to dining party management server 110 for storage in at least customer information database 112 and/or restaurant database 113. Additionally, dining party details may also be sent to restaurant computing device 131, food order management system 132, and/or POS device 133.

According to various embodiments, during dining party creation if a dining party member does not have an App 121 account, then the creator of the dining party can input the phone number associated with the mobile device of the member without an App 121 account. The created dining party group and its associated dining party details may then be sent to dining party management server 110 for storage in at least customer information database 112 and/or restaurant database 113. Server 110 may analyze the created and stored dining party group details in order to identify if any dining party members do not have an App 121 account. If the server identifies such party members, message engine 111 may retrieve the phone number from the database for such party members and generate and send a text-based message to the members mobile device 120 via the mobile device's default messaging service to the party members without an account. The text-based message may include a link that redirects the party member without the App 121 account to arm application digital distribution service landing page where the member can download the App 121 and create an account, wherein completing the App 121 account set up automatically adds the dining party member to the dining party group. In this way, system 100 encourages App 121 adoption and proliferation, Which increases the efficiency and utility of system 100 as a whole.

According to various embodiments, message engine 111 may be configured to generate and send text-based messages to user mobile device 120 via App 121 responsive to a determination that a customer is located near or has arrived at restaurant 130 via detection of the customer's mobile device 120. In some embodiments, customer detection may be determined based on biometric authentication via a biometric scanner 134 located in restaurant 130. Particularly, message engine 111 may generate and send messages to late arriving members of a dining party. For example, a dining party with one or more missing members arrives to a restaurant and is seated, and when one or more of the missing party members are detected to arrive at the restaurant, message engine 111 can send a text-based message to the mobile device 120 of the late arriving party member via App 121 with a link, which when clicked confirms the late arriving person is a member of a dining party and allows the late arriving party member to place a food order which will be included in the ticket associated with dining party's table.

According to an embodiment, when a late arriving party member is detected at the restaurant 130 the restaurant computing device 131 sends the detected members information to server 110. Server 110 can receive the detected members information and scan databases 112, 113 to identify the dining party that the detected member belongs to based on stored dining party details. After the detected member has been matched to a dining party, message engine 111 may generate a text-based message to be sent to the detected members mobile device 120. The text-based message may be generated based on a generic pre-configured message which can be populated with retrieved dining party details to customize the generic pre-configured message such that the message is personalized to that particular matched dining party. For example, if John Doe created the dining party, the generated message may be include the sentence "You have been invited to John Doe's dining party, please follow the link below to accept the invite and place your order."

In some embodiments, a table turn-time analyzer service 114 may be operable on dining party management server 110. Table turn-time analyzer service 114 be used by server 110 to retrieve information related to the current status of the tables within a restaurant 130 as well as the progress of a dining party seated at a table. For example, consider a dining party that has already been seated at a table, despite the fact that the dining party is still waiting on one of the dining party members to arrive. The members of the dining party who are seated may order some drinks or even an appetizer while they wait for the missing party member to arrive before ordering their main entrées. When the waiter for the dining party inputs their drink orders or appetizer orders in the restaurant computing device 131, food order management system 132, and/or PUS device 133, the table turn-time analyzer service 114 receives this information and calculates an estimated time when dining party will be finished with their meal. Dining party management server 110 may receive the indication that the dining party has order drinks and/or appetizers as well as receive the estimated table turn-time from table turn time analyzer service 114, and responsive to this information message engine 111 may generate and send a text-based message to the missing member mobile device 130 indicating that their dining party has ordered drinks. Additionally, analyzer service 114 may be configured to receive location and/or nap data associated with user mobile device 130 in order to track and, if necessary, alter reservation times and waitlist position.

According to various embodiments, dining party management server 110 may leverage the location tracking capabilities of table turn-dine analyzer service 114 in order to detect the location of a missing dining party member relative to the restaurant 130. The missing party member location data and the table turn-time estimates associated with missing dining party member's dining party table, may be used by message engine 111 in order to determine when to generate and send a text-based message to the mobile device 130 of the missing party member. For example, a dining party with a missing member orders drinks and the table turn-time analyzer indicates that the missing member is located about ten minutes away from the restaurant. Generally, after drink orders have been delivered to a table, a waiter will then take the food orders for the guest seated at the table. Because of this general behavior, the message engine 111 may wait until the missing dining party member is five minutes away before sending a text-based message with a link for the missing party member to place his or her food order via the App 121. In this way, message engine 111 may account for the time it takes the waiter to return with the tables drinks and the food orders for the whole dining party, even the missing members, may be received at about the same time such that the whole dining party may eat their meals together at the same dine.

For more information regarding food order management system 132 and table turn-time analyzer service 114, refer to U.S. application Ser. No. 17,037,200 the entirety of which is included herein by reference.

According to some embodiments, dining party management server 110 may comprise a zero-step automatic payment service 115 which may be used by dining party management server 110 for dining party group member detection and authentication. For more information about zero-step automatic payment service 115, refer to U.S. application Ser. No. 17,091,925, the entirety of which is included herein by reference.

Figure 2:
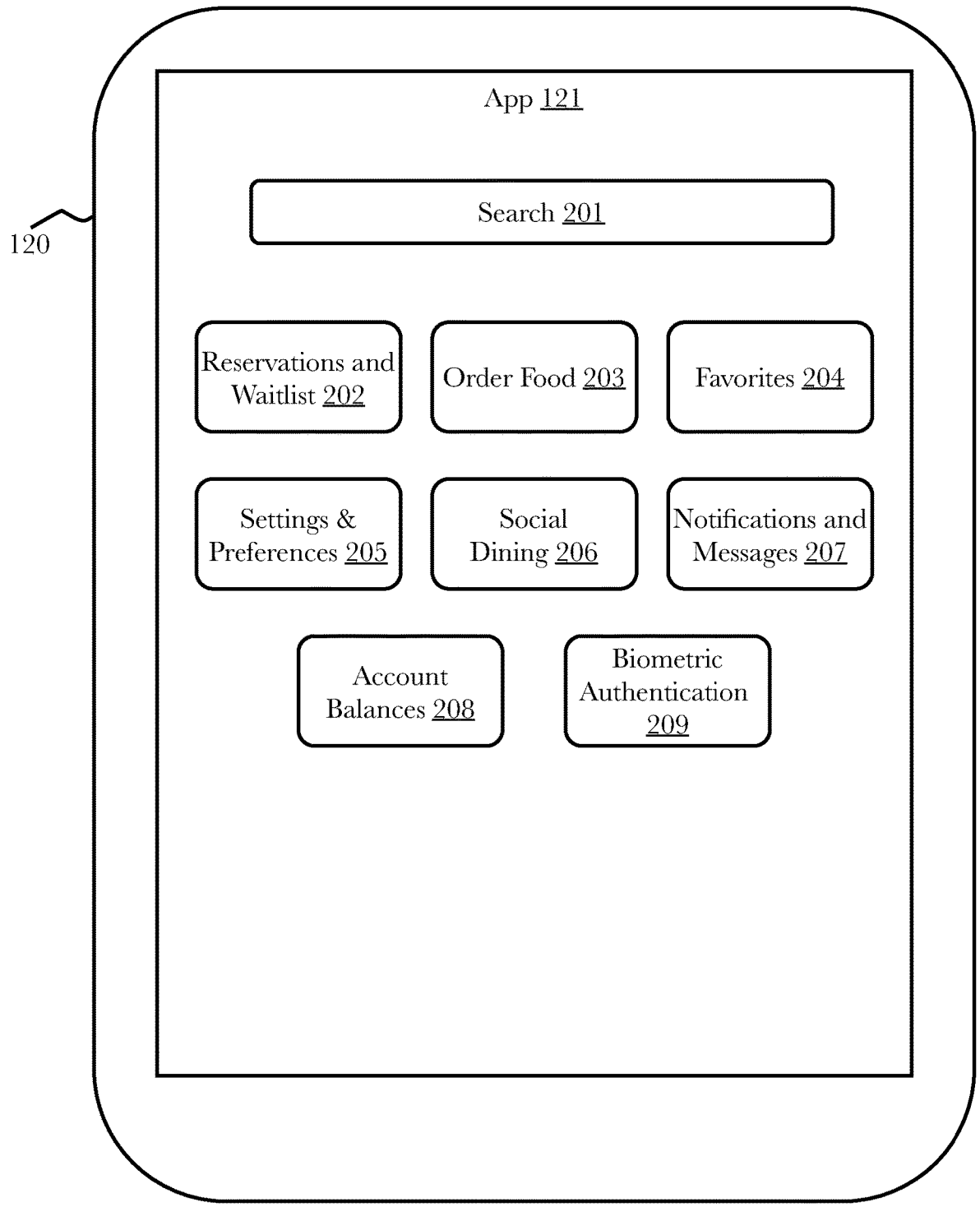
FIG. 2 is a diagram illustrating an exemplary user mobile device with an operable software application ("App") stored on the user mobile device which can provide a plurality of services, according to some embodiments.

FIG. 2 is a diagram illustrating an exemplary user mobile device 120 with an operable software application ("App") 121 stored on the user mobile device which can provide a plurality of services, according to some embodiments. The App 121 may be stored in the memory of the user mobile device 120. The App 121 may communicate with at least a server 110, a restaurant communication device 131, and/or food order management system 132. The App 121 may communicate with these devices and systems using any suitable network for hi-directional data transmission and reception including, but not limited to: cellular networks; the internet; and wireless area-networks ("WANs") such as Wi-Fi or BLUETOOTH™. The App 121 may include search functionality, such as a search bar 201 which allows App users to search for a plurality of information associated with restaurants. Examples of the type of information that may be searched for using the App include, but is not limited to: business hours of operation; menu items, including ingredient lists, if available; restaurants; types of food (e.g., Italian, Chinese, gluten free, spicy, organic, vegetarian, etc.); restaurants that in-App "friends" have eaten at recently; and user dining history (e.g., food items purchased, restaurants dined at, etc.).

In addition to the search bar 201, App 121 may comprise a plurality of services which mobile device 120 user may use to improve his or her dine-in or take-out experience. A reservation and waitlist portal 202 may allow App 121 users to make reservations at a restaurant of their choosing, or to put themselves on a waiting list. Furthermore, users may be able to view their position on a waitlist in real-time so that they may be able to do other tasks without fear of losing their spot on the waitlist. In some embodiments, reservations and waitlist portal 202 may be supported by, integrated with, or otherwise leverage a dynamic reservation and waitlist management system (as described in U.S. application Ser. No. 17,037,200, the entirety of which is included herein by reference) to process reservations and waitlist requests, as well as receive waitlist updates. App 121 users can also order food 203 through the App for pick-up or delivery. Users can browse their favorites 204, such as favorite restaurants, favorite food items, favorite dining party members, and favorite servers. Favorites 204 may be selected by the user through the App 121. In sonic embodiments, a server 110 may receive user data associated with restaurants and food orders from the App 121, and then process and analyze the data to determine user favorites. For example, a user often orders take-out from three different Thai food restaurants and the take-out orders often include a chicken pad Thai, the server may receive this information and determine the user's favorite type of food is Thai food, that the user's favorite Thai dish is chicken pad Thai, and that the user's favorite Thai restaurant of the three restaurants is the restaurant where the user has ordered from the most. In this example, the user may be able to see the automatically generated favorites in the App 121 and can verify or edit them as he or she sees fit.

The mobile device 120 user can also manage their settings and preferences 205. User defined settings may include Application access such as, for example, access to location data, notifications, contact list, voice and messaging data, and the like. User defined preferences may include, but are not limited to: food preferences (e.g., Italian, spicy, organic, fair trade, etc.), restaurant preferences (e.g., Chinese, Indian, Mexican, etc.), food allergies, preferred ingredients, preferred servers, and dining experience (e.g., intimate, fast-casual fine dining, outside dining, etc.), dining preference (e.g., dine-in, take-out, etc.). Settings and preferences 205 may also include user information including, but not limited to, age, name, gender, address, email address, social media handle, phone number, marital status, friend list, family list, and the like. The App 121 can also be used by the user to engage in social dining 206 wherein the server 110 receives the request for social dining and determines a suitable dining party (or just another single diner) which the mobile device 120 user can have a dine-in meal with based on the user's profile, settings, and preferences, as well as other third party data such as the user's current location, time of day, and nine of the week. App 121 users can also receive notifications and messages 207 from restaurant devices, server 110, or other mobile device users who have the App 121 operating on their own mobile devices, as well as send messages to these devices and other users. For example, a restaurant communication device 131 may detect the mobile device 120 of an App 121 user near the restaurant, (e.g., by using a BTLE transceiver, using biometric authentication, through GPS data, etc.) and send the detected user a special offer to entice the detected user to dine at the restaurant. As another example, server 110 may send a notification to the mobile device 120 user via the App 121 that informs the user that they have friends dining near them, or a notification that informs the user about the upcoming weekend specials at their favorite restaurant and that reservations are available. As another example, a mobile device 120 user via the App 121 can receive a message from a friend inviting them out for lunch, or a message may be received from the server 110 or restaurant, computing device 131 with an in (anon to join a dining party res a late arrival.

The App 121 may also allow users to configure and view the current state of linked financial accounts using an account balances 208 feature. The mobile device 120 user can establish an account using their mobile device with the App 121 installed and may choose to enable zero-touch automatic payments. In order to enable zero-touch automatic payments, the mobile device user can set automatic payment limits, refill limit, and a refill amount which allows the user to specify the parameters associated with their zero-touch automatic payment account. In this way, the App 121 provides a means for mobile device 120 user to be able to make reservations, order food, and automatically pay for their food order with minimal contact between the user and restaurant staff. For a more detailed description of zero-touch automatic payments, please refer to U.S. patent application Ser. No. 17,091,925, the entirety of which is included herein by reference.

According to some embodiments, App 121 may facilitate mobile device 120 users to enable and configure biometric authentication 209 which can help to facilitate contactless transactions, improve account security, and streamline customer-restaurant interactions. An App 121 user can choose to enable biometric authentication, as well as select the types of biometrics that may be used for authentication purposes. Biometric data, that may be used to identify and authenticate a mobile device 120 user may include, but are not limited to, fingerprints, voice print, eve (e.g., iris or retina) recognition, face recognition, hand and/or finger geometry, ear shape, and gait are all possible biometric features that may be used to authenticate a customer (e.g., mobile device user). A customer may walk near or into a business establishment (e.g., restaurant) that operates a biometric scanner, which may be army one of, or a combination of, a fingerprint scanner, eye scanner, facial scanner, voice scanner, or other biometric scanner to identify individuals, for either one-step or zero-step authentication, supplementing or replacing the authentication steps taken by a customer's App 121.

According to some embodiments, a typical rise case for mobile device 120 App 121 may be to rove dining group management. In this use case, a mobile device 120 user is a member of a dining party at a restaurant who has not arrived at the same time as the rest of the dining party, who have already been seated and may have already ordered their drinks, appetizers, and/or meals. When mobile device 120 user arrives at the restaurant, one of the restaurant devices 131 and/or server 110 may determine the user has arrived. This determination may be made by one of the restaurant devices 131 and/or server 110 identifying the mobile device 120 of the user via a mobile device identifier such as, for example, a device media access control ("MAC") address, International mobile equipment identity ("IMEI"), subscriber identity module ("SIM") card, or electronic serial number ("ESN"), to name a few. Alternatively, a mobile device 120 user may be identified or determined based on scanned biometric data used to authenticate the individual user. Alternatively, arrival of the late dining party member may be determined based on the interaction between BTLE transmitter and receivers operating on the user mobile device 120 and restaurant devices 131 and/or server 110. In either case, after a mobile device 120 user has been identified the restaurant devices 131 and/or server 110 may generate and send a text-based message to the user mobile device 120 via the notifications and messages portal 207 in App 121, wherein the text-based message may include an invite to a dining party and a link which when interacted with causes the mobile device user to accept the dining party invite and be redirected to the food ordering 203 App 121 interface wherein the user e.g., late arriving dining party member) can place their food order such that it will be added to the dining party ticket associated with the table. The mobile device 120 user can be seated with the rest of their dining party and every member of the dining party will be served their food at the same time.

Figure 3:
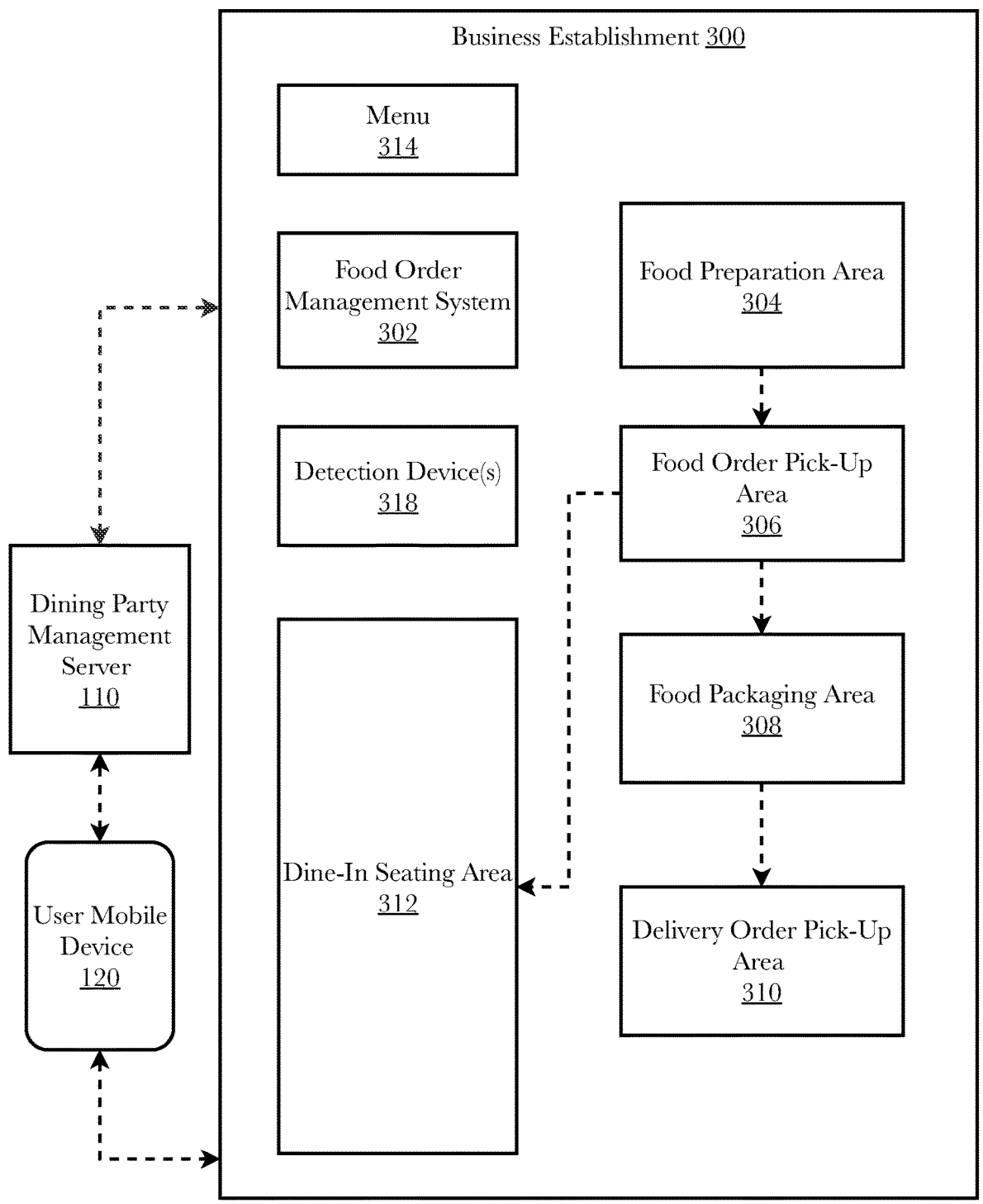
FIG. 3 is a block diagram representation of a business establishment including an embodiment of a food order management system communicatively coupled with a dining party management serer and one or more user mobile devices, according to an embodiment.

FIG. 3 is a block diagram representation of a business establishment 300 including an embodiment of a food order management system 302 communicatively coupled with a dining party management server 310 and one or more user mobile devices 320, according to an embodiment. Examples of business establishments 300 include, but are not limited to, a restaurant, a food delivery service, and a combination restaurant/food delivers service. In an embodiment, the business establishment 300 includes a food preparation area 304, a food order pick-up area 306, a food packaging area 308, a delivery order pick-up area 310, and a dine-in seating area 312. While the food preparation area 304, the food order pick-up area 306, the food packaging area 308, the delivery order pick-up area 310, and the dine-in seating area 312 are shown as being in different areas within the business establishment 300, one or more of the described areas may be integrated into a single area or may occupy overlapping areas in the business establishment 300. Different embodiments of business establishments 300 may include one or more of the food preparation area 304, the food order pick-up area 306, the food packaging area 308, the delivers; order pick-up area 310, and the dine-in seating area 312. The business establishment 300 may include additional areas that facilitate the operation of the business establishment 300.

The business establishment 300 includes a menu 314 with a listing of a plurality of different food items that are available for order at the business establishment 300. A customer of the business establishment 300 is provided with the option of selecting one or more of the food items from the menu 314 to place a food order. In an embodiment, the food order management system 302 is configured to receive food orders entered manually by business establishment personnel via a food order management system input device. In an embodiment, the food order management system 302 is configured to receive food orders electronically via a food order management system network interface. In an embodiment, the food order management system 302 is configured to receive food orders entered manually by business establishment personnel via a food order management system input device and electronically via a food order management system network interface. In another embodiment, food order management system 302 is configured to receive food order made from an App 121 operating on a user mobile device 120.

Food items in a food order are prepared in the food preparation area 304 and the completed food orders are placed in the food order pick-up area 306. Upon the receipt of a food order from a dine-in customer, the food order management system 302 coordinates the preparation of the food items in the food order in the food preparation area 304 and generates a predicted food order ready time. Different food items in the food order may have different food item preparation times. The predicted food order ready time specifies when the prepared food order is expected to be placed in the food order pick-up area 306. In an embodiment, the food order management system 302 updates the predicted food order ready time based on the actual food item preparation time taken by food preparation personnel to prepare each of the food items ire the food order in the food preparation area 304. Providing a predicted food order ready time at the time a food order is received may enable a waiter/waitress to inform a dine-in customer of when they can expect to receive the food items in their food order. Additionally, a predicted food order ready time may be received, retrieved, or otherwise obtained by dining party management server 110 in order to generate and send text-based messages to dining party members at appropriate times.

When a food order is received for delivery, the food items in the food order are prepared in the food order preparation area 304 and the completed food orders are placed in the food order pick-up area 306. Food packaging personnel pick up the complete food orders from the food order pick-up area 306 for packaging in the food packaging area 308. The packaged food orders are placed in the delivery order pick-up area 310. Delivery personnel pick up the packaged food from the delivery order pick-up area 310 for delivery to a food order delivery destination.

Upon the receipt of a food order for delivery, the food order management system 302 coordinates the preparation of the food items in the food order in the food preparation area 304, generates a predicted food order ready time, coordinates the packaging of the food items in the food order, generates a predicted packaged mod order ready time, coordinates the delivery of the food order to the food order delivery destination, and generates a predicted food order delivery time. Different food items in the food order may have different food item preparation times and/or different food item packaging times.

The predicted food order ready time specifies when the prepared food order s expected to be placed in the food order pick-up area 306 for pick-up, The predicted food order ready time provides food packaging personnel with notice regarding when the food order will be available to be picked up from the food order pick-up area 306 for packaging in the food packaging area 308. The predicted packaged food order ready time specifies when the packaged food order is expected to be placed in the delivery order pick-up area 310 for pick-up by delivery personnel. The predicted food order delivery time specifies when the food order is expected to be delivered to the food order delivery destination. The food order management system 302 generates the predicted food order delivery time based on delivery route specific data associated with the delivery route.

In an embodiment, the food order management system 302 updates the predicted food order ready time based on the actual food item preparation time taken by food preparation personnel to prepare each of the food items the food order in the food preparation area 304. In an embodiment, the food order management system 302 updates the predicted packaged food order ready time based on one or more of the actual food item preparation time taken by food preparation personnel to prepare each of the food items the food order in the food preparation area 304 and the actual food item packaging time taken by food packaging personnel to package each of the food items in the food order in the food packaging area 308. In an embodiment, the food order management system 302 updates the predicted food order delivery time based on one or more of the actual food item preparation time taken by food preparation personnel to prepare each of the food items the food order in the food preparation area 304, the actual food item packaging time taken by food packaging personnel to package each of the food items in the food order in the food packaging area 308, and changes in delivery route specific data associated with the delivery route associated with delivering the food order to the food order delivery destination.

According to various embodiments, business establishment 300 may further comprise one or more detection devices 318 configured to detect the presence of customers at or near the business establishment 300. Examples of detection devices may include, but are not limited to, biometric scanners, BLUETOOTH™ low emissions transmitters and receivers that act as beacons, user mobile device 120 identification authenticators, and the like. Business establishment 300 may also include a computing device 131 (not shown) which can store, integrate with, or act as detection devices 318. Similarly, food order management system 302 may be operable on, or integrate with computing, device 131 such that a single computing device may provide customer device detection and food order management capabilities.

According to an embodiment of the dining party group management system 100, detection device 318 may detect the presence of a dining party group member who has arrived late to the restaurant 130 (i.e., business establishment 300) via one of the detection methods described above in the preceding drawings. Upon detection of a late arriving dining party member, detection device 318 and/or computing device 131 may send the detected member's identification information to dining party management server 110. Responsive to the received detected member's identification information, server 110 may generate and send a text-based message to the user mobile device 120 associated with the detected member. The text-based message may include an invitation to join a dining party, or a confirmation as member of a dining party, as well as a link which when interacted with accepts/confirms the dining party member and relocates the detected member to a landing page where they may place a food order that can be appended to the ticket associated with the dining party's table. The detected member's food order, when placed through the redirect link can be sent to the server 110 and then the server 110 can relay the food order to the food order management system 302. In an embodiment, the detected member's food order can be sent directly front the user mobile device 130 to the food order management system 302 without having to go through dining party management server 110.

FIG. 7 is a block diagram illustrating au exemplary architecture for an aspect of the dining party group management system 100, a machine learning predictor 700, according to an embodiment. According to an embodiment, a machine learning predictor 700 may be utilized by system 100 in order to assist dining party management server 110 and message engine 111 with generating various types of alerts, notifications, and/or messages to be sent to dining party members. The machine learning predictor 700 may be trained and tested on historical input data 705 gathered from sources including, but not limited to, customer information stored in a customer information database 112, restaurant information stored in a restaurant database 113, and a plurality of $3^{rd}$ party or external sources 706. According to an embodiment, customer information can include, but is not limited to: purchase history; demographic information; friends list; financial account information; amount of time spent in a restaurant for each time the customer dines at the restaurant; customer account information; linked customer devices; customer likes, dislikes, and personal and professional interests; food preferences such as preferred food (menu) items, ingredient substitutions, food allergies, and food preparation preferences (e.g., no salt); customer name, phone number, physical address, and email address; historical dining party details such as the names of each dining party member, the location dined at, and the time of the reservation or time of arrival at the restaurant; and other information related to a customer and his interactions with a restaurant, restaurant staff, and the other members of the dining party.

According to an embodiment, restaurant information include, but is not limited historical point-of-sale data; average table turn-times; food preparation information; restaurant station (e.g., food preparation area, food packaging area, etc.) status information; inventory data; reservation and waitlist information; dining party details; restaurant hours of operation, street address, and contact information (e.g., phone number, email address, social media handle, etc.); menu items and menu item ingredients; employee schedules; waitstaff personal and professional interests; and other information related to a restaurant and it's interactions with customers.

According to an embodiment, $3^{rd}$ party and external sources 706 of information can include, but is not limited to: social media information (e.g., likes, dislikes, friend lists, group memberships, location-based check-ins, etc.); customer location data (e.g., GPS location data associated with a customer mobile device 120, data from mapping or navigational services such as GOOGLE™ Maps; and information gathered from both private and public databases. $3^{rd}$ party and external resources 706 may be accessed and collected via an appropriate network 140 connection such as, for example, the Internet.

According to various embodiments, the information stored in customer information database 112 and restaurant database 113 is typically pre-processed prior to being stored database 112 and 113. Pre-processing of data may include various data cleaning and transformation techniques know in the art such as, for example, instance selection, normalization, data resealing, data standardizing, mean removal, and the like. Although in some aspects, a data pre-processor 710 may be present which can clean and transform the input data 705 into the appropriate format for use in training and implementing the machine learning predictor 700. In some embodiments, data pre-processor may also be configured to perform feature extraction and/or engineering wherein the input data is transformed into features that better represent the underlying problem to the predictive models used to implement machine learning predictor 700. In this way, the proper input dataset may be prepared such that it is compatible with the machine learning algorithm requirements while also improving the performance of the machine learning models.

According to various embodiments, machine learning predictor 700 may be implemented using a plurality of machine learning algorithms including, but not limited to, regression (linear and logistic), random forest, K-means, Naïve Bayes, deep learning neural networks, graph based neural networks, and regression trees, to name a few. Machine learning predictor 700 may receive a plurality of inputs about customers, restaurants, and associated data in order to generate as output, one or more predictions related to the timing of sending alerts, notifications, and/or messages to customers and more particularly members of a dining party group, as well as the timing at which to begin preparing the food orders associated with a dining party group. Initially, the predictions generated by predictor 700 may be based on historical behavior data associated with both customers and restaurants, but the predictor 700 is designed to continuously learn and adapt its predictive models based on new customer and restaurant input data. The new data can include near real-time data that is received from user mobile device 120, external resources 706, restaurant computing device 131 food order management, system 132, and one or more databases.

Machine learning predictor 700 may be configured to learn patterns and habits of customers and restaurants at varying degrees of granularity. For example, a group of four people meet up as a dining party at a restaurant once a month and typically order drinks and then converse with each other for about, twenty minutes before they order their food. Machine learning predictor 700 may be able to infer the twenty minutes of time the dining party spends conversing with each other b receiving as inputs the POS information related to the ordering of drinks and the ordering of food. Predictor 700 may learn this inferred behavior of the dining party group and apply this knowledge when generating predictions. For example, of the above mentioned dining party of four, two of the dining party members arrive on time, while the other two members of the dining party are one their way to the restaurant, the predictor 700, using received locational data associated with the two members who are on their way, may determine that one member is five minutes away while the other member is fifteen minutes away, and based on this determination in view of the inferred knowledge that the dining party prefers to converse for about twenty minutes before ordering their food, the predictor may generate a predicted time at which to send a message to the two missing party members. Continuing this example, the party member who is five minutes away may be immediately sent a message informing the party member that the members at the restaurant have ordered drinks and include a link where the party member who is five minutes away can order a drink so that it is ready and waiting for them when they arrive. Similarly, for the party member who is fifteen minutes away, the predictor 700 may determine that the a message can be sent in ten minutes (when the party member is then five minutes away from arriving) such that the party member can order a drink so that it is ready and waiting them as they arrive to the restaurant. The predicted times at which to send a message and the contents of the message may be further based on restaurant data such as a current busyness level of the restaurant and/or its staff. For example, if the restaurant isn't very busy, then predictor 700 may wait until the missing dining party member is closer to the restaurant (e.g., 2 minutes away) before sending a message. In this way, when the dining party member arrives, their food and/or drink may be prepared closer to the time of their arrival such that the food is still hot and the drinks are still cold and/or not watered down by ice melting.

Additionally, machine learning predictor 700 may be configured to learn about the patterns and behavior at a more macro level. For example, predictions may be based on data for a single restaurant, or for a group of restaurants that share a similar characteristic (e.g., group of Italian restaurants, group of restaurants in a geographic location, etc.). As another example, predictions may be generalized based on dining party data gathered from all dining parties of a restaurant or group of restaurants. In a similar manner, machine learning predictor 700 may be configured to make predictions for a particular customer or group of customers. For example, a dining party created for a business lunch may have different properties and characteristics than a dining party created for a group of friends or a family. Predictor 700 may be able to learn the patterns and behavior associated with a group of people such as, for example, business professionals, and apply the learned patterns and behaviors of the group to an individual who belongs to said group. Furthermore, predictor 700 can view the dining party details associated with a customer, such as the other members of the dining party, and can learn to predict, the context of the dining party's visit to the restaurant based at least in part on the dining party details and the customer information related to the dining party members.

According to an embodiment, machine learning predictor 700 outputs 730 may be sent to message engine 111 wherein the message engine 111 determines when and what type of message to send to one or more dining party group members based on the received predictor 700 outputs. Outputs 730 may also be persisted to one or more databases 112, 113 for storage and may be linked to a customer profile and/or restaurant profile. According to some embodiments, an output comparator 720 may be present which allows for comparisons between predictor outputs and real life data such that the output comparator provides a feedback loop in order to train and improve machine learning predictor 700 functions and outputs. For example, predictor 700 generates a predicted time at which to send a text-based message to a dining party member who has not arrived yet, and can compare the predicted time against the actual arrival time of the missing party member, via party member detection of arrival, as well as the time it took the restaurant to prepare and serve the food order of the late arriving dining party member. In this way, machine learning predictor 700 can continuously learn from the comparisons of outputs 730 to actual data in order to autonomously refine the predictive capabilities.

Detailed Description of Exemplary Aspects

Figures 4A, 4B:
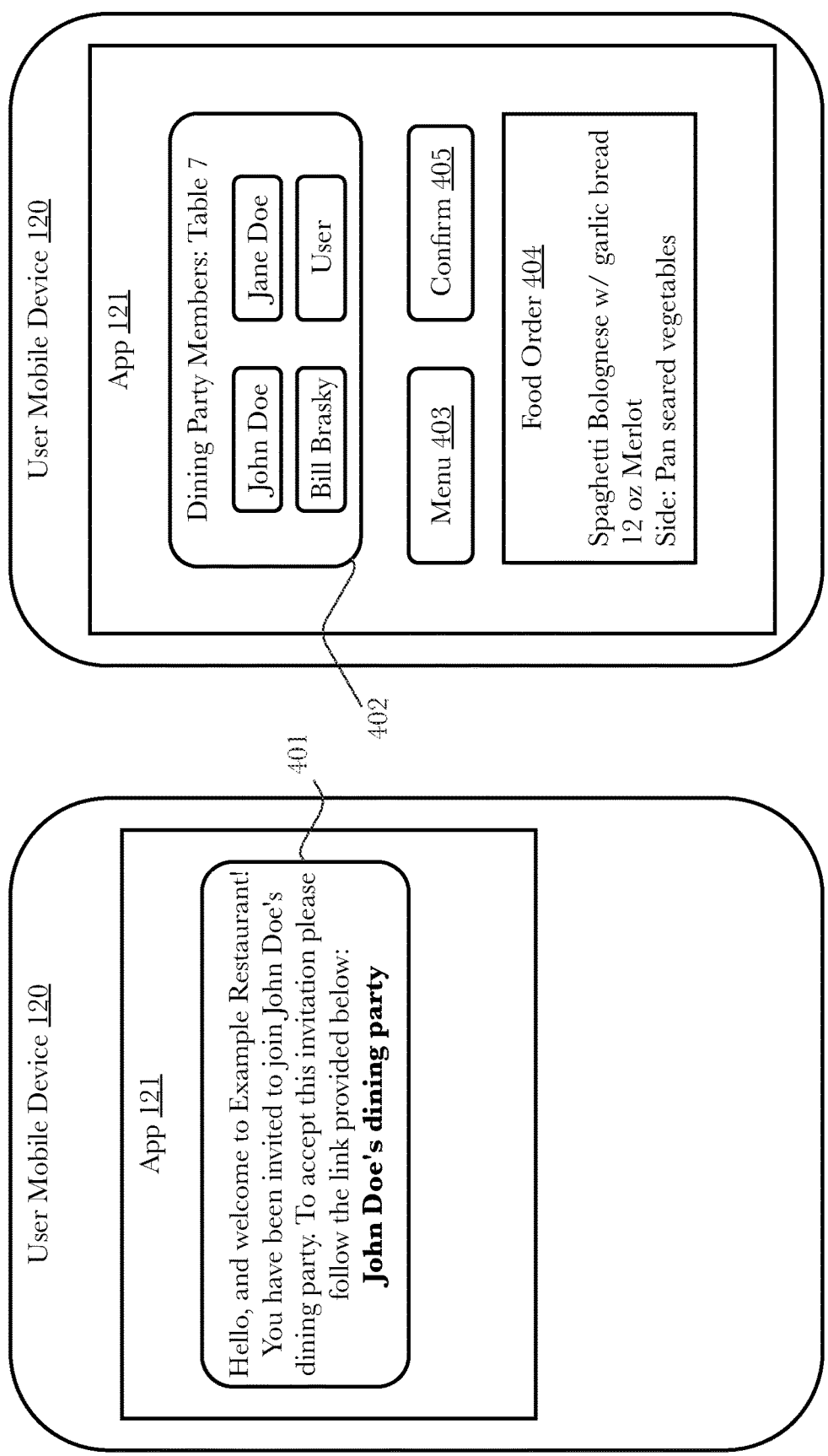
FIGS. 4A and 4B illustrate an exemplary text-based message with a link that may be generated by dining party management server and the food order landing page the embedded link redirects the customer to, according to an embodiment.

FIGS. 4A and 4B illustrate an exemplary text-based message with a link that may be generated by dining party management server and the food order landing page the embedded link redirects the customer to, according to an embodiment. Referring to FIG. 4A, a user mobile device 120 is shown with an App 121 operating on the user mobile device 120. App 121 may have notifications and messages portal 207 which can be used to send and receive notifications and messages from other App 121 users, business establishments 300, restaurants 130, and/or a dining party management server 110. In this example, the user mobile device 120 has received a text-based message with a link 401 from dining party management server 110. The text-based message includes at invitation to join John Doe's dining parry with an embedded link (indicated by the bold lettering in text-based message 401) that the device user may click on. By clicking on the link, the mobile device 120 user accepts the dining party invitation and is redirected to the food ordering portal 203 interface of App 121.

Referring to FIG. 4B, an exemplary App 121 landing page for the embedded link is shown on a user mobile device 120. The landing page may include dining party details 402 such as the other members of the dining party, the table number where the dining party is to be seated, and other details such as what the other members have order may be viewed by clicking on the name of an individual dining party members. The landing page may also include a menu 403 so that a food order may be placed by the party member who clicked on the embedded link. A food order window 404 may be present which allows the App 121 user to view and manage their food order. Once a customer has selected their food order, they may confirm 405 their order. The confirmed order may then be sent from the riser mobile device 120 to a food order management system 302 and/or a restaurant computing device 131 wherein the received food order is appended to the food order associated with ticket for the dining party table. Food order management system 302 may receive the food order from the late arriving dining party member, and based on data received from food preparation area 304, it may assign a priority to the late arrival's food order such that the entire dining party may each be served their food at the same time.

FIG. 4A is an example of a text-based message that may be sent to the messaging portal 207 of App 121 however, dining party management server 110 may also be configured to send a text-based message to the default messaging service of a user mobile device 120 if the owner of the user mobile device 120 does not have an App 121 account. In this case, the creator of the dining party may be able to add the phone number associated with a dining party group member who does not have an App 121 account. In an embodiment, the creator of the dining group may just input the name of the dining party group member that does not have an App 121 account, and the App 121 operating on mobile device of the creator of dining group can automatically scan the creator s contact list on their mobile device 120 and retrieve the phone number associated with the name of the dining party group member that does not have an App 121 account. Then, instead of server 110 sending a text-based message to the messaging portal of the App 121, it may send a text-based message to the default messaging service on the mobile device 120 of the dining party group member with an App 121 account. The text-based message sent to the default messaging service may be very similar to message 401, with a key difference being where the embedded link redirects the dining party member without an App 121 account. In this case, when the dining party member without the App 121 account clicks on the link, they can be redirected to an application digital distribution service where the device user can download App 121 and create an account. After App 121 account registration, the dining party member can be directed to a landing page similar to that illustrated in FIG. 4B.

Figure 5:
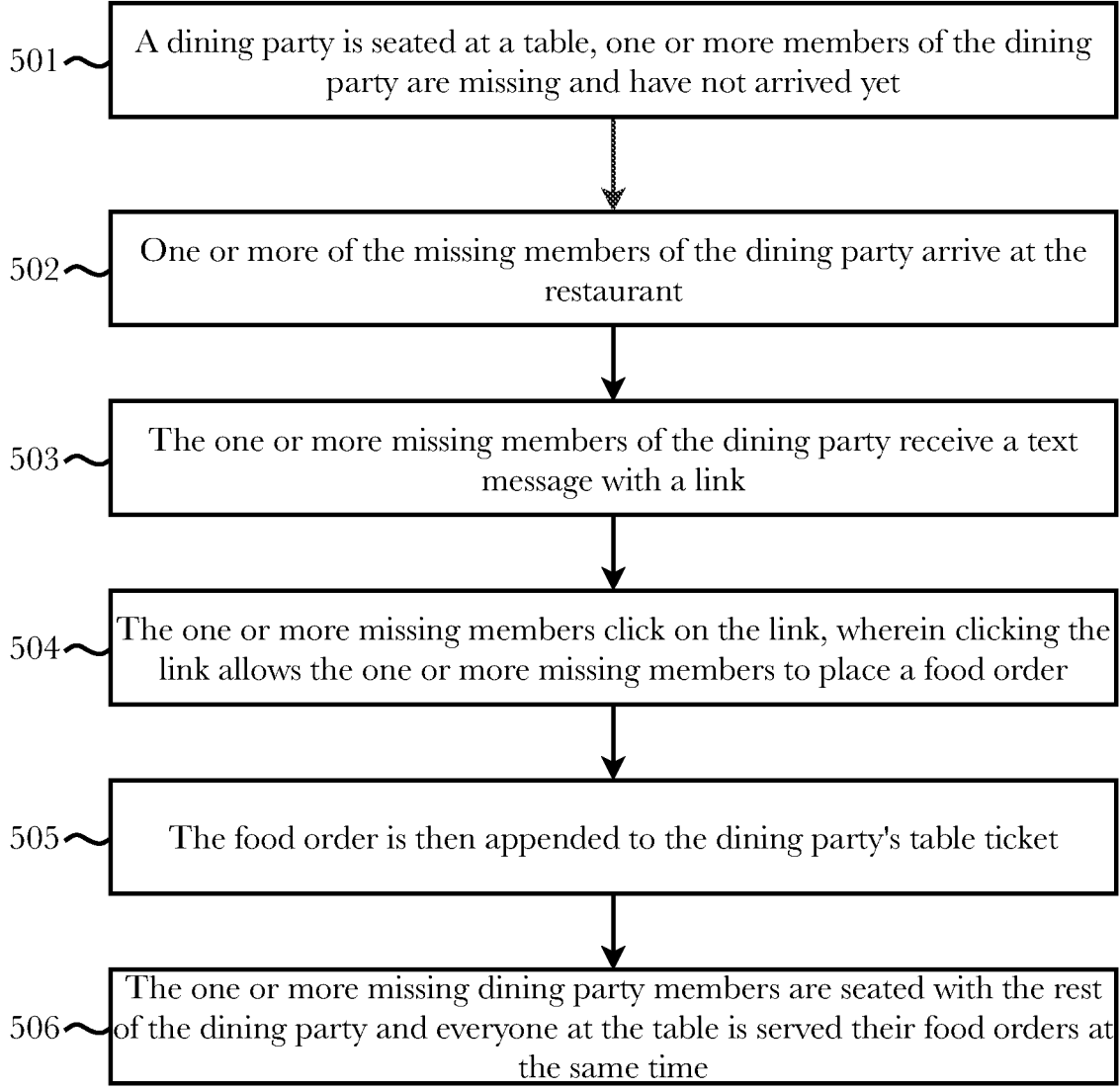
FIG. 5 is a flow diagram illustrating an exemplary method for dynamic dining party group management, according to an embodiment.

FIG. 5 is a flow diagram illustrating an exemplary method 500 for dynamic dining party group management, according to an embodiment. According to an aspect of an embodiment, the process may begin 501 when a dining party with one or more missing members arrives at a restaurant, checks-in with restaurant staff and is seated at a table. Each member of the dining party may have a mobile device (e.g., tablet, smart phone, smart wearable device, etc.) and operable on the mobile device may be a software application which may provide a plurality of functions and services such as, for example, providing an interface from which to place a food order to participating restaurants, make/cancel reservations, dining party check-in, and receiving notifications and/or messages from at least a restaurant communication device, a restaurant mobile device, or a messaging server. According to some embodiments, the user mobile devices may further comprise a BTLE transmitter and receiver and an application that is configured to utilize such a transmitter/receiver. Each device has an operating range for its BTLE transmitter/receiver to operate, and when the device crosses this threshold, it may receive a beacon transmission from another device, and they may transmit communications with each other. As a next step, one or more of the missing members of the dining party arrive at the restaurant 502; their arrival may be detected using the BTLE transmitter/receiver operating on the user mobile device and one of the BTLE transmitter/receivers operating on at least the restaurant communication device or the restaurant mobile devices. According to some embodiments, late arriving party members may be detected as arriving to the restaurant using global positioning system ("GPS") operating on the user mobile device. In this embodiment, the missing party member location may be received, retrieved, or otherwise obtained, inferred or derived by dining party management server 110 using GPS location data from the user mobile device. In an embodiment, the one or more missing members of the dining party may detected using biometric scanner(s) and biometric information stored in a customer information database 112. In yet another embodiment, the one or more missing dining party members may be detected by a unique user mobile device identifier.

Detection of the missing party member(s) arrival to the restaurant causes dining party management server 110 to generate and transmit a text-based message 503 to the App 121 operating on the user mobile device. The text-based message can include, but is not limited to, an imitation to a dining party and a link, which when clicked on by the late-arriving dining party member, causes the party member to be checked in with the dining party and directed to an in App 121 portal for placing a food order 504. The food order of the late-arriving dining party member can then be appended 505 to the dining party's food order and assigned a priority status in the back of house stations (e.g., food preparation 304, food order pick-up 306, food packaging 308, delivery order pick-up 310, etc.) such that both the members of the dining party that arrived on time and the late-arriving members may be served their food at the same time 506, without causing the on-time members to wait longer than normal.

FIG. 6 a flow diagram illustrating an exemplary method 600 for dynamic dining party group management using text-based messages to manage late arriving dining party members, according to an embodiment. According to an embodiment, the process begins 601 when a dining party is created by one of the dining party members using the App 121 operating on the creator's mobile device 120. A dining party may be created by selecting from a friend list within the App 121 the members of the dining party. If the creator of the dining party wants to include a person who does not have an App 121 account, then the creator of the dining party can manually add that person's name and phone number to the dining party details. In some embodiments, the dining party creator need only to manually add the name of the person without an App 121 account, and the App 121 can scan the creators contact list for the name and automatically add that person's phone number to the dining party details. The dining party may arrive to the restaurant and be seated, while still waiting on one or more dining party members to arrive. As a next step, 602 the one or more missing dining party members are detected as they arrive at the restaurant. Once detected, dining party management server 110 and/or restaurant computing device 131 may determine if the detected member has an App 121 account 603. If the detected member does have an App 121 account, then the process proceeds to step 604 and server 110 may generate and send a text-based message to be viewed in the App 121 with an invite to join the dining party and an embedded link. The detected dining party member may view the text-based message and accept the invitation 605 by interacting with (e.g., clicking, tapping, etc.) the link which may redirect the detected member to an in App 121 food ordering interface where they can place their food order 606. The food order may be sent to server 110 and/or restaurant computing device 131 (or food order management system 132) where the food order may be appended to the dining party table's ticket 607. As a last step, the one or more missing dining party members can be seated with the dining party and everyone at the table is served their food orders at the same time 608.

If instead, at step 603 it is determined that the detected party member does not have an App 121 account, then the detected party member's phone number may be retrieved from the dining party details stored in the at least the customer information database 112 and/or restaurant database 113 and the detected missing member may 609 receive a text-based message with a link via the default messaging service on their mobile device 120. In this case, the text based message similarly 610 invites the detected member to join a dining party and also includes a link. However, this link, when interacted with, redirects the detected member to an appropriate application digital distribution service wherein the detected member may 611 download App 121 and create an App 121 account. After creation of an App 121 account, the detected missing member may then be redirected to a food ordering portal interface wherein they can place a food order 606. Then their food order can be appended to the dining party's table ticket 607 and the detected missing member can be seated with the rest of the dining party where they can be served their food orders at the same time 608.

FIG. 8 is a flow diagram illustrating an exemplary process 800 for training a machine learning predictor, according to an embodiment. According to an embodiment, a machine learning predictor 700 model may be built and trained by 801 receiving a plurality of input data from a plurality of sources, such as customer information database 112, restaurant database 113, user mobile device 120, App 121, restaurant computing device 131, food order management system 132, and various external resources 706. As a next step, 802 the received input data may be pre-processed prior to being fed into the machine learning algorithm. According to an embodiment, data may be pre-processed into training and testing datasets. Then, 803 the plurality pre-processed input data may be used to train a predictive network in order to create a machine learned predictive model which predicts a time to send a message and a time to begin preparing a food order. The trained predictive model is used to generate outputs 804 and the predicted outputs may be used by message engine 111 to determine when to send messages to lining party members and when to begin preparing dining party food orders 805. Then, the outputs of the predictive model may be compared against actual data 806 in a manner as to provide feedback 807 to the predictive network so that the predictive models may be continuously updated and learning from each iteration of the process 800.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on art application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for sonic of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example arm end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable deice, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB) Serial, Ethernet, FIREWIRE™, THUNDERBOLT™, PCI, parallel, radio frequency (RF), BLUETOOTH™, near-field communications (e.g., using near-field magnetics), 802.11 (WiFi), flame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 include physical ports appropriate for communication with appropriate media. In some cases, they may also include an independent processor (such as a dedicated audio or video processor, as is common in the art for high-fidelity A/V hardware interlaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced In an assembler or a linker, byte code, such as may be generated by for example a JAVA™ compiler and may be executed using a Java virtual machine or equivalent, or files containing higher level code that may be executed by the computer using art interpreter (for example, scripts written in Python, Perl, Ruby, Groovy, or any other scripting language).

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data, storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices, NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for dynamic dining party group management, comprising:
    a machine learning algorithm operating on a dining party management server;
    a restaurant information database stored on a non-volatile data storage device of the dining party management server, the restaurant information database comprising information for a restaurant;
    a dining party management server comprising a memory, a processor, the non-volatile data storage device, and a plurality of programming instructions stored in the memory which, when operating on the processor, causes the dining party management server to:
    receive and store a created dining party, the created dining party comprising dining party details;
    receive missing dining party member group member identification information;
    generate a text-based message, the text-based message comprising an invitation to join the created dining party and an embedded link;
    send the text-based message to a mobile device software application resident on a mobile device associated with the missing dining party group member via a network;
    receive a food order via the network from the mobile device;
    retrieve restaurant information for the restaurant from the restaurant information database;
    process the food order and the restaurant information through the machine learning algorithm to determine a food preparation start time; and
    send the food preparation start time to a restaurant computing device to initiate preparation of the food order at the food preparation start time; and
    the mobile device software application comprising at least a plurality of programming instructions stored in a memory of, and operating on at least one processor of, a computing device, wherein the plurality of programming instructions, when operating on the at least one processor, causes the computing device to:
    receive the text-based message from the dining party management server via the network;
    redirect the user of the mobile device software application to a food ordering portal, the food ordering portal being associated with the created dining party and displaying the dining party details;
    allow the mobile device software application user to place the food order using the food ordering portal; and
    send the food order to the dining party management server and a restaurant computing device via the network; and
    a restaurant computing device for the restaurant comprising at least a plurality of programming instructions stored in a memory of, and operating on at least one processor of, a computing device, wherein the plurality of programming instructions, when operating on the at least one processor, causes the computing device to:
    automatically detect the arrival at or near the restaurant of a missing dining party group member;
    send missing dining party group member identification information to a dining party management server;
    receive the food order from the mobile device software application;
    append the food order to a dining party ticket;
    receive the food order preparation start time from the dining party management server; and
    automatically schedule preparation of the food order at the food order preparation start time;
        wherein the machine learning algorithm is trained to predict food preparation start times based on the missing dining party member group member identification information and the retrieved restaurant information;
        wherein the restaurant computing device and the mobile device each further comprise a low emission transmitter and receiver and an application configured to utilize such a transmitter and receiver; and
        further wherein the automatic detection of the arrival of the missing is accomplished by:
    sending, from the restaurant computing device, a beacon signal;
    receiving the beacon signal at the mobile device when the mobile device is in range of the beacon signal; and
    receiving at the restaurant computing device a response to the beacon signal from the mobile device, the response comprising at least an identifier corresponding to the mobile device.

* * * * *